United States Patent
Wade et al.

(10) Patent No.: US 10,230,227 B1
(45) Date of Patent: Mar. 12, 2019

(54) OUTDOOR JUNCTION BOX

(71) Applicant: Sasquatch Solar, LLC, Hollady, UT (US)

(72) Inventors: Benjamin Wade, Holladay, UT (US); Lee Hatley, Arvada, CO (US)

(73) Assignee: Sasquatch Solar, LLC, Holladay, UT (US)

( * ) Notice: Subject to any disclaimer, the term of this patent is extended or adjusted under 35 U.S.C. 154(b) by 0 days.

(21) Appl. No.: 15/963,707

(22) Filed: Apr. 26, 2018

(51) Int. Cl.
*H02G 3/08* (2006.01)
*H02G 3/14* (2006.01)
*H02S 40/34* (2014.01)
*H02S 20/23* (2014.01)

(52) U.S. Cl.
CPC ............. *H02G 3/088* (2013.01); *H02G 3/083* (2013.01); *H02G 3/14* (2013.01); *H02S 20/23* (2014.12); *H02S 40/34* (2014.12)

(58) Field of Classification Search
None
See application file for complete search history.

(56) References Cited

U.S. PATENT DOCUMENTS

| | | | | |
|---|---|---|---|---|
| 6,023,247 A | * | 2/2000 | Rodeffer | H01Q 1/18 343/765 |
| 6,271,467 B1 | * | 8/2001 | Book | H02B 13/005 174/496 |
| 6,526,701 B2 | * | 3/2003 | Stearns | E04D 13/10 52/24 |
| 6,942,189 B2 | * | 9/2005 | Capozzi | H01Q 1/02 248/122.1 |
| 7,109,415 B2 | * | 9/2006 | Neitzel | H02G 3/085 174/50 |
| 7,154,040 B1 | * | 12/2006 | Tompkins | H02G 3/126 174/50 |
| 7,353,961 B2 | * | 4/2008 | Hull | H02G 3/085 174/666 |
| 7,626,118 B1 | | 12/2009 | Capozzi | |
| 8,479,455 B2 | * | 7/2013 | Schaefer | H02G 3/088 174/564 |
| 9,496,697 B1 | | 11/2016 | Wentworth | |
| 9,819,166 B1 | * | 11/2017 | Capozzi | H02G 3/088 |
| 9,935,356 B2 | * | 4/2018 | Wentworth | E04D 13/1476 |

\* cited by examiner

*Primary Examiner* — Dimary S Lopez Cruz
(74) *Attorney, Agent, or Firm* — Maschoff Brennan

(57) ABSTRACT

A junction box may include a flashing that includes a first and second surface. The first surface may define a first circular groove. The junction box may include a housing attached to the flashing. The housing may be positioned at least a second distance from edges of the flashing. The housing may include sidewalls that form ends, which may include a first end oriented towards a first edge of the flashing. The housing may include a bottom portion attached to the sidewalls, which may define a second circular groove. The second circular groove may include a similar diameter as the first circular groove. The second circular groove may be concentric with the first circular groove on a parallel plane. The second circular groove may indicate suitable hole positions. The housing may additionally include a top portion that defines an opening, which may be concentric with the second circular groove.

20 Claims, 12 Drawing Sheets

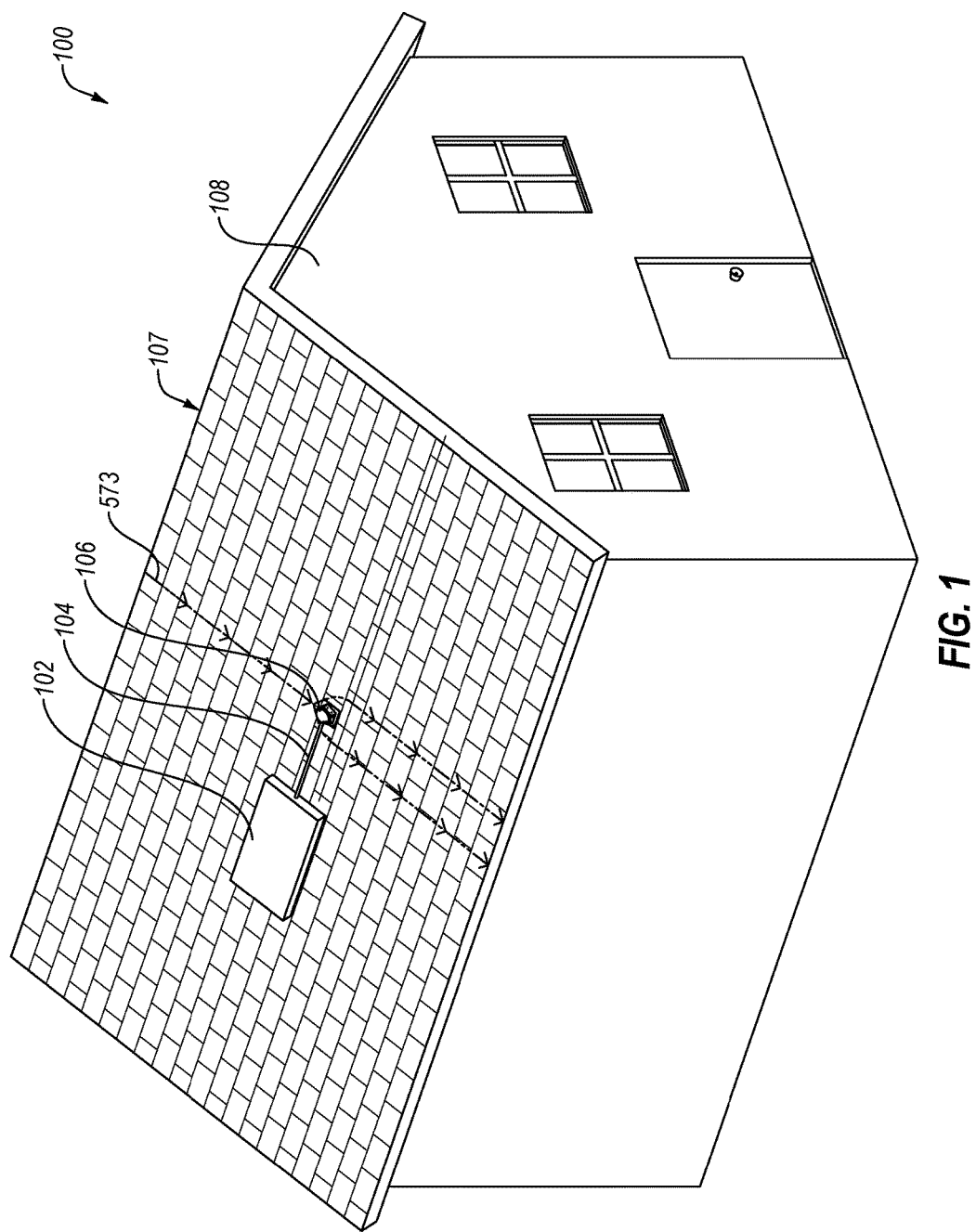

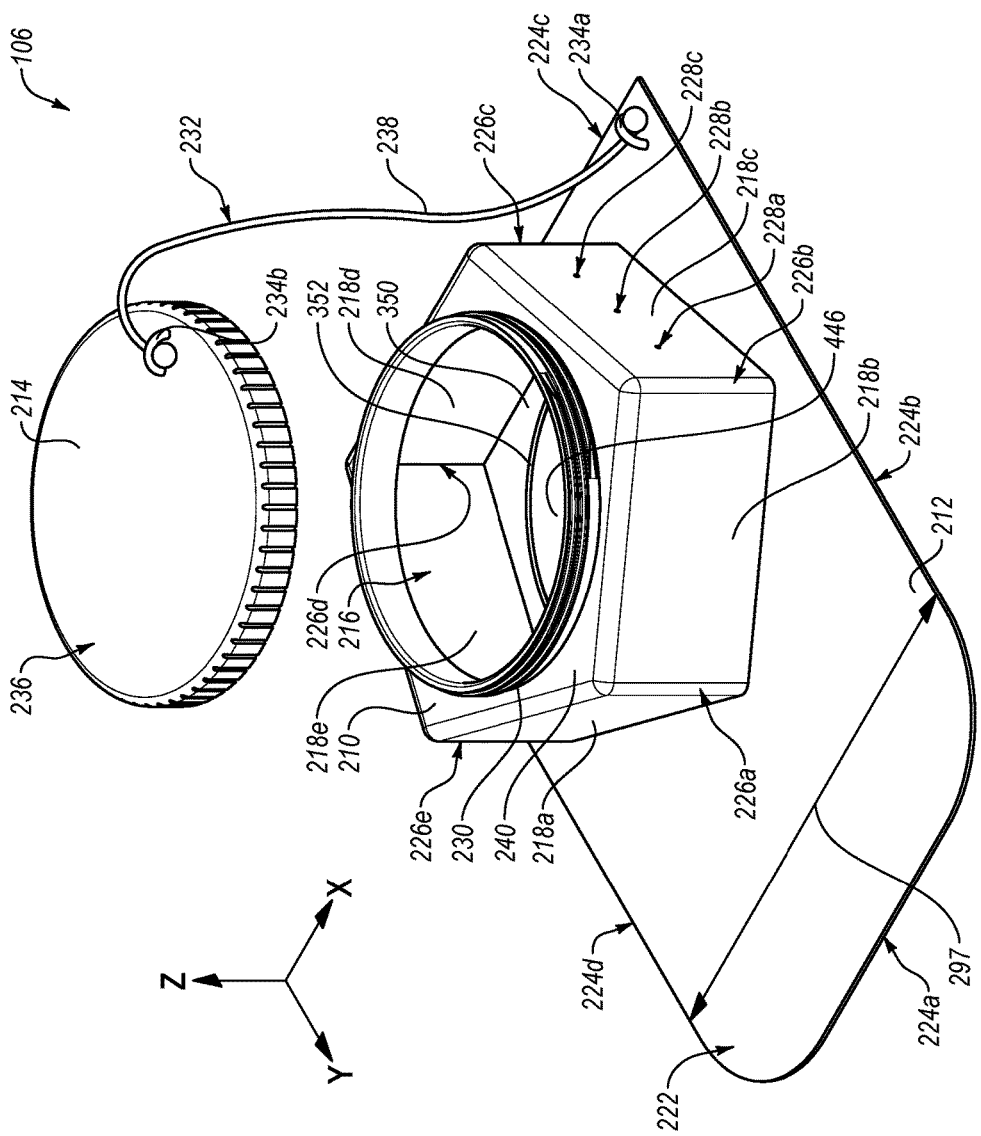

OUTDOOR JUNCTION BOX

FIELD

The embodiments described in the present disclosure are related to junction boxes, in particular some embodiments are related to outdoor junction boxes.

BACKGROUND

Junction boxes may be used to receive, route, and connect portions of utility systems. For instance, electrical junction boxes may receive electrical cables from multiple electrical components. The electrical cables may be electrically coupled to one another within the electrical junction boxes. Such electrical coupling may electrically couple the multiple electrical components. The junction boxes may be covered or otherwise closed, which may reduce interaction with the electrical cables coupled therein.

Junction boxes used in interior spaces are generally comprised of metals or plastics. These junction boxes are poorly suited for use in locations in which they are exposed to outdoor environmental conditions. For instance, the junction boxes comprised of metals or plastics may rust or deteriorate due to exposure to water and heat.

Some junction boxes may be configured for exterior or outdoor use. The exterior junction box may be used to connect and/or route cables from one or more external devices. The external junction boxes may be attached to an exterior surface of a structure and may be at least partially environmentally sealed. However, existing outdoor junction boxes suffer from several deficiencies. For instance, existing outdoor junction boxes are poorly integrated with the exterior surfaces, which may result in concentration of snow and water on the existing junction box. Additionally, installation of the existing outdoor junction boxes is difficult, which may result in poorly attached outdoor junction boxes.

The subject matter claimed herein is not limited to embodiments that solve any disadvantages or that operate only in environments such as those described above. Rather, this background is only provided to illustrate one example technology area where some embodiments described herein may be practiced.

SUMMARY OF SOME EXAMPLE EMBODIMENTS

In an example embodiment, a junction box may include a flashing. The flashing may include a first surface and a second surface. The first surface may define a first circular groove. The junction box may also include a housing. The housing may be attached to the flashing. The housing may be positioned at least a second distance from multiple edges of the flashing. The housing may include multiple sidewalls that form multiple ends. The multiple ends may include a first end formed by a first sidewall and a second sidewall. The first end may be oriented towards a first edge of the flashing. The housing may also include a bottom portion that is attached to the multiple sidewalls. The bottom portion may define a second circular groove. The second circular groove may include a substantially similar diameter as the first circular groove. The second circular groove may be substantially concentric with the first circular groove on a substantially parallel place. The second circular groove may indicate suitable hole positions in the bottom portion. The housing may additionally include a top portion that defines an opening. The opening may be substantially concentric with the second circular groove.

In another example embodiment, a junction box may include a single unibody piece. The single unibody piece may include a flashing. The flashing may include a first surface and a second surface. The first surface may define a first circular groove. A perimeter of the first circular groove may be at least one and a half inches from edges of the flashing. The single unibody piece may also include a housing positioned at least a second distance from the edges of the flashing. The housing may include multiple sidewalls that form multiple ends. The multiple ends may include a first end formed by a first sidewall and a second sidewall. The first end may be oriented towards a first edge of the flashing. A third sidewall, a fourth sidewall, and a fifth sidewall may each include multiple dimples to indicate suitable hole positions. The housing may also include a bottom portion. The bottom portion may be attached to the multiple sidewalls. The bottom portion may define a second circular groove that includes a substantially similar diameter to the first circular groove. The second circular groove may indicate suitable hole positions in the bottom portion. The second circular groove may include indicia of suitable fastener locations. The housing may additionally include a top portion that defines an opening. The opening may be substantially concentric with the second circular groove. The housing may include a threaded portion that is attached to the opening. The single unibody piece may additionally include a first eave that is attached to a second end formed by the second sidewall and a third sidewall. The first eave may be positioned at a first angle that is substantially similar to a second angle of the second sidewall relative to the first edge of the flashing. The single unibody piece may include a second eave that is attached to a third end formed by the first sidewall and a fourth sidewall. The second eave may be positioned at a third angle that is substantially similar to a fourth angle of the first sidewall relative to the first edge of the flashing.

In yet another example embodiment, a junction box may include a housing. The housing may include multiple sidewalls. The multiple sidewalls may include a third sidewall, a fourth sidewall, and a fifth sidewall that each include multiple dimples. The multiple dimples may indicate suitable hole positions. The housing may also include a bottom portion. The bottom portion may be attached to the multiple sidewalls. The bottom portion may define a second circular groove and a first circular groove. The second circular groove may include a substantially similar diameter as the first circular groove. The second circular groove may be substantially concentric with the first circular groove located on a substantially parallel plane. The second circular groove may indicate suitable hole positions in the bottom portion. The second circular groove may include indicia of suitable fastener locations. The housing may additionally include a top portion. The top portion may define an opening. The opening may be substantially concentric with the second circular groove.

These example embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

FIG. 1 illustrates an operating environment in which an example junction box may be implemented;

FIG. 2A illustrates a perspective view of the junction box of FIG. 1;

DETAILED DESCRIPTION

Figure 2B:
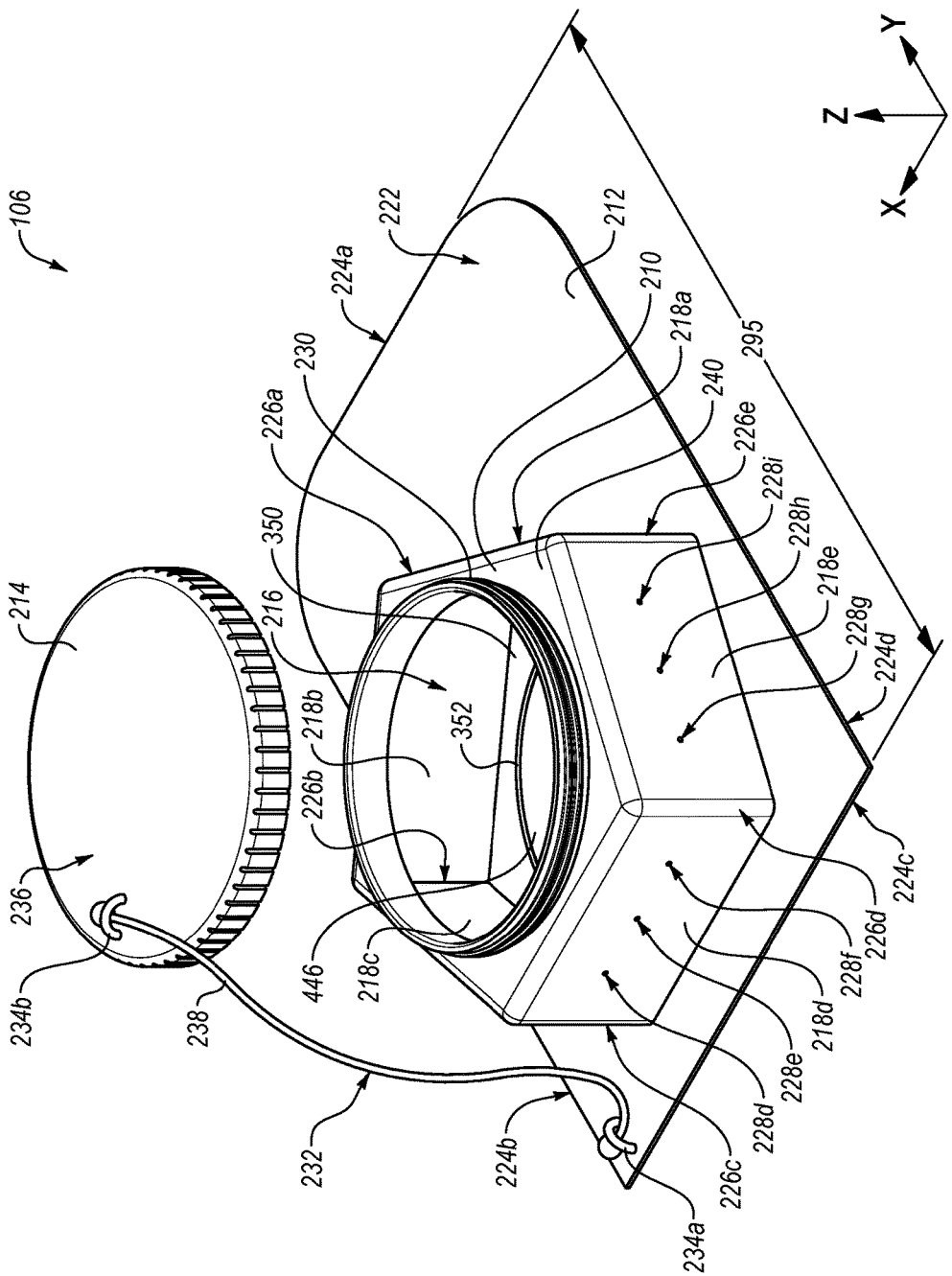
FIG. 2B illustrates another perspective view of the junction box of FIG. 1.

A junction box may be used for routing cables, wires, and/or other devices coupled to an external device located on an exterior surface of a structure to an interior space of the structure. For example, the cables, wires, and/or other devices may be coupled to a solar panel located on a roof of a house. Other devices may include coaxial cables, registered jack 45 ("RJ45") cables, and any other appropriate device. The cables, wires, and/or other devices may be routed from the external device to electrical connections located in the interior space of the structure using the junction box.

Some conventional junction boxes may include knock-outs and/or holes. The knock-outs are portions of the junction box configured to easily detach to create an opening. The knock-outs and/or the holes are located at pre-determined locations in a housing of the junction box. The openings left when the knock-outs are removed and/or the holes may enable the cables, wires, and/or other devices to be routed into the housing of the junction box. Connectors may be fitted to the housing to seal the openings and holes through which the cables, wires, and/or other devices are routed. However, the pre-determined location of the knock-outs and holes may limit where the junction box may be placed and may limit connector types that may be used in combination with the housing of the junction box.

Additionally, in some conventional junction boxes, a lid may overlap a bottom piece of the housing. In particular, the lid, when attached to the housing, may extend beyond sidewalls of the bottom piece, which may define a space between the lid and the bottom portion that is substantially unsealed. Accordingly, environmental items such as water and dirt may enter the housing through the space, which may result in damage to the cables, wires, and/or other devices in the junction box. Additionally, portions of the environmental items may enter an interior structure adjacent to the external surface to which the junction box is attached.

Housings of some conventional junction boxes may include a substantially square or rectangular shape. When these conventional junction boxes are installed, surfaces of the housing are positioned at an angle substantially perpendicular to a flow of fluid on the exterior surface of the structure (e.g., substantially parallel to an apex of the exterior surface). Accordingly, fluids (e.g., rain, snow, and/or melting snow) may pool against the surface of the housing, which may reduce a life of the junction box.

Attachment features of conventional junction boxes may limit placement relative to external surfaces. For example, some conventional junction boxes may include a pipe or conduit that extends from a bottom surface of the junction box. To check placement and fit of the junction box, a hole in the exterior surface of the structure is created prior to placement of the junction box. Additionally, the pipe or the conduit extending from the bottom surface may be fixed relative to the junction box, which may cause a problem routing the cables or wires, into the interior space of the structure. For instance, if placement of the junction box causes the pipe or the conduit to be adjacent to a rafter or other structural support.

Some conventional junction boxes may include conductive material (e.g., metal). These conventional junction boxes must be electrically grounded to pass inspection in at least some jurisdictions. The junction box may be grounded using a ground of the structure and/or a ground of the external device. Grounding the junction box may increase a number of connections to these conventional junction boxes, time involved in installation of these junction boxes, and/or a number of pieces of equipment used for installation of these junction boxes. Some conventional junction boxes may include a lid or another portion that may be selectively attached to a housing. These lids may be small or include parts that are small and thus may be easily dropped and lost, which may introduce problems passing inspection and/or cost additional expense to replace the lost lids or included parts.

Installation of junction boxes on the exterior surface of a structure may be difficult and dangerous. Junction boxes that include features that reduce time, a number of tools, and/or a number of pieces of equipment used to install the junction boxes (collectively, resources/complexity) may reduce risks and costs associated with installation of the junction boxes. In particular, reductions in the resources/complexity may be achieved by using a junction box that includes more suitable locations for routing cables, wires, and/or other devices from the external device while environmentally sealing a housing of the junction box (e.g., sealed to substantially prevent contaminants such as dirt, water, snow, or other environmental elements from entering an internal volume of the housing). Additionally, the resources/complexity may also be achieved by using a junction box that includes surfaces of the housing that sheds fluids, that retains removable pieces (e.g., a lid or other fasteners), and that are not comprised of conductive materials (e.g., does not include metal).

Accordingly, embodiments described in the present disclosure are directed to an improved junction box that addresses some or all of the shortcomings of conventional junction boxes described above. In some embodiments, a junction box may include a flashing and a housing. The flashing may be configured to be positioned between multiple layers of shingles. The flashing may cover holes that are exposed due to shingle fasteners being removed during installation of the junction box. The flashing may define a first circular groove. The first circular groove may indicate suitable placement of sealant and/or other adhesives on a first surface of the flashing. Suitable placement of the sealant and/or adhesives on the first surface of the flashing may be between a perimeter of the first circular groove and one or more edges of the flashing.

The junction box may include the housing, which may be attached to the flashing and positioned a distance from the edges of the flashing. The housing may include a bottom portion that defines a second circular groove. The second circular groove may indicate suitable positions for creation of a hole in a bottom portion of the housing. Cables, wires, and/or other devices may be routed into an interior space of a structure through the created hole. Additionally, the second circular groove may indicate suitable placement of fasteners for attachment of the junction box to the exterior surface of the structure. Suitable positions for creating a hole in the bottom portion may be anywhere within the second circular groove.

Indicating suitable positions for the hole may permit the junction box to be attached to the exterior surface without creating holes in the exterior surface prior to placement of the junction box. The second circular groove may be sized so that rafters or other support structures may be adjacent to the second circular groove while leaving sufficient clearance for a hole to be created without drilling into the rafters or other support structures. The size and position of the second circular groove may permit the junction box to be positioned at a location that is functional relative to the external device rather than relative to the rafters and/or other support structures. Additionally, a size and position of the second circular groove may correspond to the first circular groove.

In some embodiments, the housing may include multiple sidewalls that meet to form ends. A first end formed by a first sidewall and a second sidewall may be oriented towards a first edge of the flashing. When installed on the structure, the first end may be oriented towards an apex of the exterior surface (e.g., substantially parallel to a flow of a fluid on the exterior surface). The first sidewall and the second sidewall may be positioned at an angle not parallel to the first edge of the flashing. The first end and the positioning of the first sidewall and the second sidewall may prevent and/or reduce fluid from pooling on a surface of the housing.

In some embodiments, a third sidewall, a fourth sidewall, and a fifth sidewall may define one or more dimples in each sidewall. The dimples may indicate suitable positions for creating a hole in the sidewalls to route the cables, wires, and/or the other devices from the external device into an interior volume of the housing. The dimples may be positioned to permit a variety of connector types to be used for routing the cables or wires. When fastened to the sidewalls, the connector may environmentally seal the holes in the sidewalls. Additionally, a dimple may be positioned at a center point of each of the sidewalls for a configuration in which a single hole is to be created in a sidewall. Multiple other dimples may be positioned equidistant from each other and from ends of the housing. The multiple other dimples may permit multiple holes to be created and multiple connectors to be used together on the same sidewall without the connectors being too close to each other and/or a hole being too close to an end of the housing.

In some embodiments, the housing may include a top portion. The top portion may define an opening that includes an attachment portion. A size and position of the opening may correspond to a size and position of the second circular groove. The attachment portion may permit a lid to attach and environmentally seal the internal volume.

In some embodiments, the junction box may be comprised of a single unibody piece of material that forms the housing and the flashing. In these and other embodiments, the junction box may include a non-conductive material (e.g., plastic). Thus, the junction box may not require electrical grounding of the junction box. The junction box may also include a retention system. The retention system may be attached to the lid and a second surface of the flashing. The retention system may selectively attach the lid (e.g., retain the lid) to the flashing when the lid is not attached to the housing.

FIG. 1 illustrates an example operating environment 100 in which a junction box 106 may be implemented. The operating environment 100 may include a structure 108 on which an external device 102 and the junction box 106 are installed. The external device 102 may be connected to the junction box 106 via a connection device 104. For example, the structure 108 may include an exterior surface. The exterior surface in the operating environment 100 of FIG. 1 includes a shingled roof. In other environments, the exterior surface may include, another type of roof, an exterior array, an angled wall, or another suitable exterior surface. The external device 102 and the junction box 106 may be attached to the exterior surface of the structure 108. In the embodiment of FIG. 1, the structure 108 includes a house. In other embodiments, the structure 108 may include another structure such as a shed, a garage, a solar array, or another suitable structure to which the external device 102 and/or the junction box 106 may be attached.

The external device 102 may include any device that includes cables, wires, and/or other devices that are to be routed from the external device 102 to an interior space of the structure 108. For example, the external device 102 may include a solar panel array, a satellite dish, or a battery system. The solar panel array may include photovoltaic wires that are to be routed through the junction box 106 into the interior space of the structure 108. In some embodiments, the cables, wires, and/or other devices may be routed through the exterior surface via the junction box 106. The cables, wires, and/or other devices may then electrically couple the external device 102 to an electrical device located in an interior space of the structure 108 or to a power grid. In some embodiments, the cables, wires, or other devices from multiple external devices (e.g., the external device 102) may be joined at the junction box 106.

In embodiments in which the external surface includes a shingled roof, when installed, a portion of the junction box 106 (e.g., a portion of a flashing) may be placed under a layer of shingles on the exterior surface. For example, one or more shingles may be raised away from the exterior surface and the portion of the flashing of the junction box 106 may be placed between the shingles and the exterior surface. The shingles may be shaped corresponding to a first end, a first sidewall, and/or a second sidewall of a housing of the junction box 106. Some additional details of examples of the first end, the first sidewall, the second sidewall, and the housing are provided elsewhere in the present disclosure. The shingles may be shaped using substantially straight lines corresponding to the first end, the first sidewall, and/or the second sidewall of the junction box 106.

Additionally, the junction box 106 may be installed so that the first end of the housing may be oriented towards an apex 107 of the exterior surface (e.g., a ridge line of the roof). The first end may be oriented towards the apex 107 of the exterior surface (e.g., substantially parallel to the flow of a fluid 573 on the exterior surface). The junction box 106 may be installed below the apex 107 relative to gravity. Additionally, a first edge of the flashing may be installed substantially parallel to the apex 107 of the structure (e.g., substantially perpendicular to the flow of the fluid 573 on the exterior surface). The first sidewall and the second sidewall may be positioned at angles substantially not parallel relative to the apex of the exterior surface.

The first end, the first sidewall, and/or the second sidewall may prevent and/or reduce the fluid 573 from pooling on a surface of the junction box 106. For example, the flow of the fluid 573 may be in a direction away from the apex 107, relative to gravity, towards the junction box 106. The flow of the fluid 573 may cause at least a portion of the fluid 573 to contact the first end of the housing, the first sidewall, and/or the first end. The portion of the fluid 573 that contacts the first end may contact the first end then traverse along a surface of the first sidewall or the second sidewall. Additionally, the fluid 573 that contacts the first sidewall or the second sidewall may traverse the corresponding sidewall. The angles of the first sidewall and the second sidewall may direct the fluid 573 away from the housing. The angles of the first sidewall, the second sidewall, and the first end may prevent the fluid 573 from pooling on a surface of the housing.

The cables, wires, and/or other devices may be routed from the external device 102 to the junction box 106 through the connection device 104. In some embodiments, the connection device 104 may include a conduit. In other embodiments, the connection device 104 may include the cables, wires, and/or other devices and a connector. In these and other embodiments, the connector may include multiple pieces configured to attach to each other and sandwich a portion of the housing surrounding a hole in a sidewall of the housing between the pieces. The connector may environmentally seal the hole in which the cables or wires are routed through. Although, the junction box 106 as illustrated includes a single connection point on a single sidewall of the junction box 106, it is understood that multiple connection points may be used on multiple sidewalls and/or a single sidewall or a single connection point may be used on multiple sidewalls.

The junction box 106 may provide an environmentally sealed device for routing cables, wires, and/or other devices from the external device 102 to an interior space of the structure 108.

FIGS. 2A and 2B illustrate perspective views of an embodiment of the junction box 106 of FIG. 1. The junction box 106 may be implemented on an external surface of a structure and may provide a structure through which cables, wires, and/or other devices may be routed.

With combined reference to FIGS. 2A-2B, the junction box 106 may include a flashing 212, a housing 210, a lid 214, and a retention system 232. The flashing 212 may include a second surface 222. The flashing 212 may also include at least one of a first edge 224a, a second edge 224b, a third edge 224c, and a fourth edge 224d (generally, edge 224 or edges 224). The edges 224 may define a perimeter of the flashing 212. The flashing 212 may include a width 297 defined between the second edge 224b and the fourth edge 224d and a length 295 defined between the first edge 224a and the third edge 224c. In some embodiments, the width may be between about six inches and about fourteen inches. In these and other embodiments, the length may be between about six inches and about eighteen inches. The flashing 212 may include a thickness defined in the z-direction between 0.06 inches and an inch. Additionally, the edges 224 may form corners of the flashing 212. In some embodiments, the corners may be formed to include a substantially ninety degree angle. In other embodiments, the corners may be formed to include a radius. The radius may be between about one-half inches and about three inches.

A portion of the flashing 212 may be placed under a portion of an exterior surface of the structure. For example, the portion of the exterior surface may contact a portion of the second surface 222. The portion of the flashing 212 that may be placed under a portion of the exterior surface may extend from the first edge 224a up to a second end 226b and a fifth end 226e of the housing 210. For example, an end of the portion of exterior surface may be coplanar with the second end 226b and the fifth end 226e.

The housing 210 may provide a durable and environmentally sealed device for routing cables, wires, and/or other devices from an external device mounted on an external surface of a structure to an internal space of the structure. The housing 210 may include a first sidewall 218a, a second sidewall 218b, a third sidewall 218c, a fourth sidewall 218d, and a fifth sidewall 218e (generally, sidewalls 218 or sidewall 218). The sidewalls 218 may include a thickness between about 0.06 inches and about one inch. The housing 210 may also include a first end 226a, a second end 226b, the third end 226c, a fourth end 226d, and the fifth end 226e (generally, ends 226 or end 226). The first sidewall 218a and the second sidewall 218b may form the first end 226a. The second sidewall 218b and the third sidewall 218c may form the second end 226b. The third sidewall 218c and the fourth sidewall 218d may form the third end 226c. The fourth sidewall 218d and the fifth sidewall 218e may form the fourth end 226d. The fifth sidewall 218e and the first sidewall 218a may form the fifth end 226e. Although, the sidewalls 218 as illustrated form a pentagonal or substantially pentagonal shape, it is understood that the sidewalls 218 may form any appropriate shape for shedding fluid and attaching one or more connectors to a sidewall 218.

The third sidewall 218c may define a first dimple 228a, a second dimple 228b, and a third dimple 228c (FIG. 2A). The fourth sidewall 218d may define a fourth dimple 228d, a fifth dimple 228e, and a sixth dimple 228f (FIG. 2B). The fifth sidewall 218e may define a seventh dimple 228g, an eighth dimple 228h, and a ninth dimple 228i (shown, e.g., in FIG. 2B).

In some embodiments, the third sidewall 218c, the fourth sidewall 218d, and the fifth sidewall 218e may define a center dimple. For example, the third sidewall 218c may define the second simple 228b as a center dimple, the fourth sidewall 218d may define the fifth dimple 228e as a center dimple, and the fifth sidewall 218e may define the eighth dimple 228h as a center dimple. A center dimple may be aligned with a center portion of the sidewalls 218. The center portion may be equidistant from the ends 226 partially formed by the sidewalls 218.

In some embodiments, the third sidewall 218c, the fourth sidewall 218d, and the fifth sidewall 218e may define multiple equidistant dimples. For example, the third sidewall 218c may define the first dimple 228a and the third dimple 228c as equidistant dimples, the fourth sidewall 218d may define the fourth dimple 228d and the sixth dimple 228f as equidistant dimples, and the fifth sidewall 218e may define the seventh dimple 228g and the ninth dimple 228i as equidistant dimples. Equidistant dimples may be equally distanced from each other and/or from the ends 226 at least partially formed by the sidewalls 218.

In some embodiments, the third sidewall 218c, the fourth sidewall 218d, and the fifth sidewall 218e may define the dimples to be equidistant from each other and may also define one of the dimples as a center dimple. For example, the third sidewall 218c may define the first dimple 228a, the second dimple 228b, and the third dimple 228c as equidistant dimples and the second dimple 228b may be defined to be aligned with a center portion of the third sidewall 218c.

The housing 210 may also include a top portion 240 and a bottom portion 350. The top portion 240 may include an attachment portion 230. Additionally, the top portion 240 may define an opening 216. The bottom portion 350 may include a thickness defined in the z-direction between about 0.06 inches and about one inch.

The bottom portion 350 may define a second circular groove 352. Additionally, the bottom portion 350 may include a first portion 446. The first portion 446 of the bottom portion 350 may be positioned within a perimeter of the second circular groove 352.

The housing 210 and the flashing 212 may be comprised of a single unibody piece of material. For example, the housing 210 and the flashing 212 may be formed using mold W injection techniques as a single piece.

In some embodiments, the ends 226 may be formed to form a sharp point. In other embodiments, the ends 226 may be formed to form a rounded point. Additionally, in some embodiments, the sidewalls 218 may be attached to the top portion 240 to form a sharp point. In other embodiments, the sidewalls 218 may be attached to the top portion 240 to form a rounded point. In some embodiments, the top portion 240 may be sloped relative to the bottom portion 350 and/or the second surface 222 of the flashing 212. The top portion 240 may be sloped to prevent and/or reduce fluid from pooling on a surface of the top portion 240.

In some embodiments, the housing 210, the flashing 212, the lid 214, and the retention system 232 may include a non-conductive material. In some embodiments, the housing 210, the flashing 212, the lid 214, and the retention system 232 may include a plastic material, a polycarbonate material, a polyvinyl (PVC) material, an acrylonitrile butadiene styrene (ABS) material, acrylonitrile styrene and polycarbonate blend (ASA+PC) material, a polycarbonate and ABS blend (PC+ABS) material, or any other appropriate non-conductive material. In these and other embodiments, the housing 210, the flashing 212, the lid 214, and the retention system 232 material may be infused with a non-conductive ultraviolet (UV) resistant material. For example, the housing 210, the flashing 212, the lid 214, and the retention system 232 may be infused with a low molecular weight hydroxyphenyl-benzotriazole material, a high molecular weight hydroxyphenyl-benzotriazole material, or any other appropriate non-conductive UV resistant material. The housing 210, the flashing, the lid, and the retention system 232 not comprising conductive material may limit a number of connections to the junction box 106 since the junction box 106 will not need to be grounded.

The housing 210 may be positioned a distance from the edges 224. The distance the housing 210 is positioned from the edges 224 may be such that the perimeter of the second circular groove 352 and a first circular groove (discussed below in relation to FIGS. 3A and 4B) is at least a particular distance from the edges 224. The particular distance is discussed in more detail with reference to FIGS. 3B and 4B.

Additionally, the housing 210 may be positioned such that the first end 226a is oriented towards the first edge 224a. The first end 226a may be formed such that, when the junction box 106 is installed, the first end 226a is oriented towards an apex of the exterior surface of the structure, such as the apex of a roof. Additionally, the first sidewall 218a and the second sidewall 218b may be positioned such that an angle formed by the first sidewall 218a and the second sidewall 218b at the first end 226a may be between five degrees and one hundred seventy degrees. For example, the angle may be between sixty five degrees and one hundred twenty degrees. Furthermore, the first sidewall 218a and the second sidewall 218b forming the first end 226a such that the first end 226a is oriented towards the apex of a structure may permit the junction box 106 to be installed without fluid pooling on surfaces of the housing 210.

The bottom portion 350 may be attached to the sidewalls 218. The second circular groove 352 may indicate suitable positions for creating a hole in the bottom portion 350 (e.g., suitable hole positions in the bottom portion 350). Furthermore, placement of the second circular groove 352 may permit the junction box 106 to be installed in a place on the exterior surface that reduces a number of connectors or a distance between the junction box 106 and an external device rather than being installed to avoid rafters and/or other support structures.

Additionally, the second circular groove 352 may indicate suitable placement positions of fasteners for attaching the junction box 106 to the structure. Placement of the fasteners within the housing 210 rather than the second surface 222 of the flashing 212 may prevent the fasteners from falling and getting lost because the fasteners may remain within the housing 210 if dropped.

Although, the second circular groove 352 as illustrated is a groove defined by the bottom portion 350, it is understood that the second circular groove 352 may include any appropriate indicia for indicating suitable positions for creating a hole in the bottom portion 350. For example, the second circular groove 352 may include a different color than a color of the bottom portion 350, hatching, or any other appropriate indicia. Although, the second circular groove 352 as illustrated is circular in shape, it is understood that the second circular groove 352 may include a square, a rectangle, a triangle or any other appropriate shape.

A size and a position of the opening 216 may correspond to the second circular groove 352. For example, a diameter of the opening 216 may be the same or substantially similar to a diameter of the second circular groove 352. As another example, the opening 216 may be concentric with the second circular groove 352. In some embodiments, the diameter of the opening 216 and the diameter of the second circular groove 352 may be equal to or greater than three inches. For example, the diameter of the opening 216 and the diameter of the second circular groove 352 may be equal to five inches. The opening 216 may be configured to permit a user to access an interior volume of the housing 210 to access the cables, wires, and/or other devices located within the interior volume of the housing 210.

The attachment portion 230 may be positioned and/or sized corresponding to the opening 216. In some embodiments, the attachment portion 230 may include a threaded portion, a snap on portion, a friction fit portion, or any other appropriate type of closure portion. The lid 214 may selectively attach to the housing 210 via the attachment portion 230. The lid 214 when attached to the housing 210 may environmentally seal the internal volume of the housing 210 (e.g., a volume defined by the lid 214 and the housing 210). The internal volume is discussed in more detail below in relation to FIG. 3A.

The sidewalls 218 may extend a height above the second surface 222. In some embodiments, the height of the sidewalls 218 may be equal to or greater than about two and a half inches. In other embodiments, the height of the sidewalls 218 may be equal to or less than about fourteen inches.

The dimples 228a-228i defined by the third sidewall 218c, the fourth sidewall 218d, and the fifth sidewall 218e may indicate suitable positions for creating a hole in the sidewalls 218 (e.g., suitable hole positions in the sidewalls 218). The suitable positions for creating a hole in the sidewalls 218 may be configured for electrical metallic tubing (EMT) connectors, strain reliefs, PVC connectors, Rigid connectors, non-metallic liquid tight conduit, or any other appropriate connector type for routing the cables, wires, and/or other devices through a hole in the sidewalls 218 and environmentally sealing the hole. For example, the suitable positions for creating a hole in the sidewalls 218 may permit connectors that include a diameter between about a quarter inch and about two inches to be used. Although, the dimples 228a-228i as illustrated are indentations in the sidewalls 218, it is understood that the dimples 228a-228i may include any appropriate indicia for indicating suitable positions for creating a hole in the third sidewall 218c, the fourth sidewall 218d, and/or the fifth sidewall 218e. The dimples 228a-228i may permit connectors to be fitted to the housing 210 in more places and/or using more types of connectors. Additionally, the dimples 228a-228i may permit connectors to be fitted on more sides of the housing 210, which may also permit the junction box 106 to be installed in a place on the exterior surface that reduces a number of connectors or a distance between the junction box 106 and an external device.

The retention system 232 may include a first retention portion 234a, a second retention portion 234b, and a retention device 238. The first retention portion 234a may be attached to the second surface 222 of the flashing 212. The lid 214 may include a first surface 236. The second retention portion 234b may be attached to the first surface 236 of the lid 214. The retention device 238 may be attached to both the first retention portion 234a and the second retention portion 234b. The retention system 232 may selectively attach the lid 214 to the flashing 212. The retention system 232 may be employed to prevent the lid 214 from falling or becoming separated from the housing 210 and/or the flashing 212. In some embodiments, the flashing 212 may be omitted. In these and other embodiments, the first retention portion 234a may be attached to a sidewall 218.

The retention device 238 may include a chord, a strap, a rope, a band, a bungee cord, a hinge or any other appropriate device for selectively attaching the lid 214 to the flashing 212. A length of the retention device 238 may permit the lid 214 to attach to the housing 210 via the attachment portion 230. For example, the length of the retention device 238 may permit the lid 214 to rotate around the attachment portion 230.

The lid 214 may include a portion that assists in generating torque on the lid. For example, the lid 214 may include a portion that extends away from the first surface 236 of the lid 214 (e.g., a tab). As another example, the lid 214 may include a ribbed portion, as illustrated in FIGS. 2A-2B. As yet another example, the lid 214 may include a keyed portion configured to receive a wrench, a drill bit or any other appropriate device for applying torque on the lid 214.

In some embodiments, the first portion 446 of the bottom portion 350 may include an ethylene propylene diene monomer (EPDM) rubber material. In other embodiments, the first portion 446 of the bottom portion 350 may include a thickness that is less than the thickness of the bottom portion 350 between the perimeter of the second circular groove 352 and the sidewalls 218. The first portion 446 of the bottom portion 350 may permit an EMT pipe or any other appropriate connector type to push through the first portion 446 of the bottom portion 350 so as to create an appropriately sized and positioned hole in the first portion 446 of the bottom portion 350.

In some embodiments, the junction box 106 may include a terminal rail (not illustrated). The terminal rail may be attached to the junction box 106 within the internal volume of the housing 210. For example, the terminal rail may be attached to the bottom portion 350. The terminal rail may be used for routing and/or connecting the cables, wires, and/or other devices from the external device to the internal volume of the structure. The terminal rail may be a connector that electrically couples two or more cables, wires, and/or other devices to each other by clamping the two or more cables, wires, and/or other devices to one or more conductive portions of the terminal rail.

In some embodiments, the junction 106 may include a din rail (not illustrated). The din rail may be attached to the junction box 106 within the internal volume of the housing 210. For example, the din rail may be attached to the bottom portion 350. The din rail may be used for routing and/or connecting the cables, wires, and/or other devices from the external device to the internal volume of the structure. The din rail may be a connector that electrically couples two or more cables, wires, and/or other devices to each other by coupling the two or more cables, wires, and/or other devices to one or more conductive portions of the din rail.

Figure 3A:
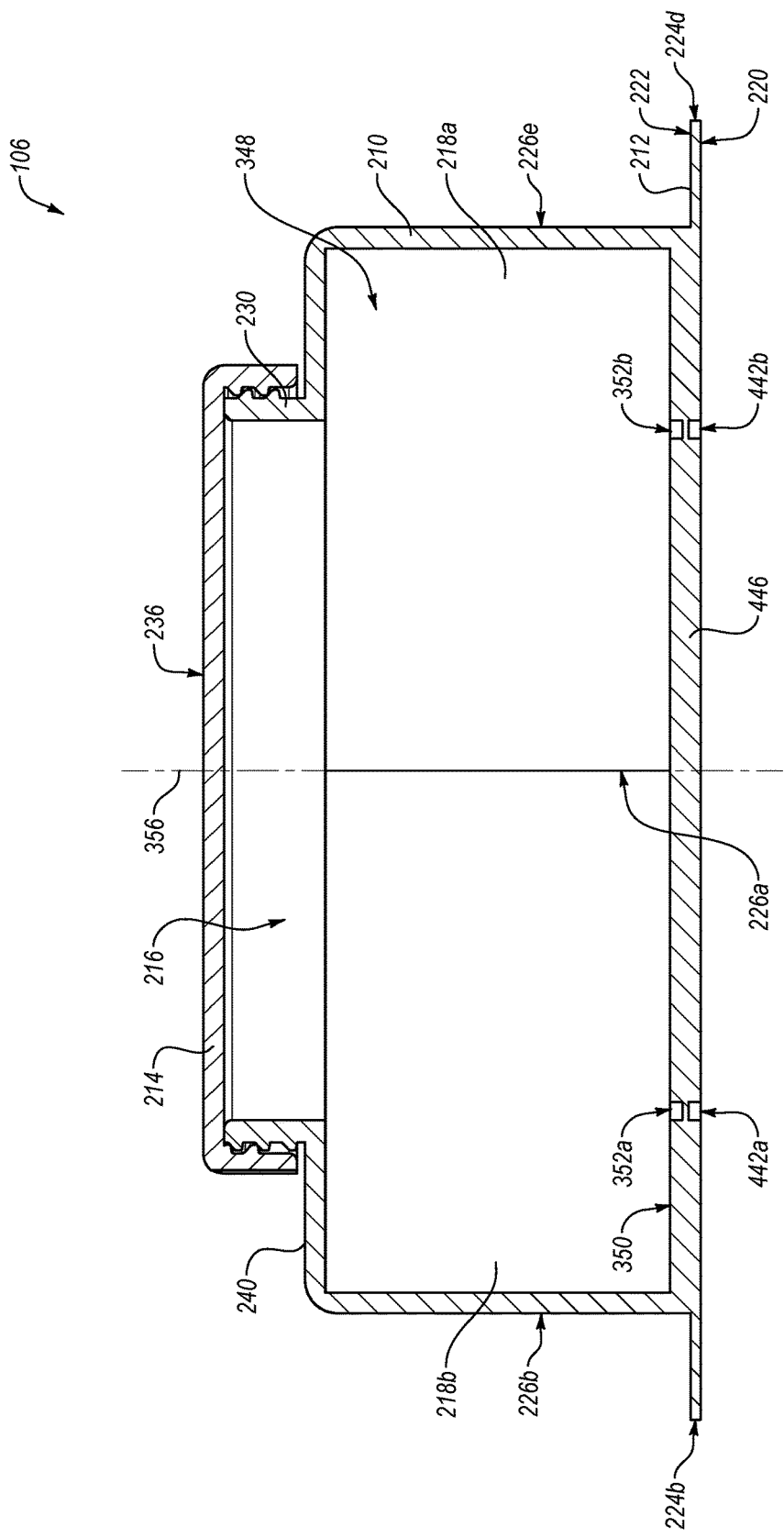
FIG. 3A illustrates another view of the junction box of FIG. 1.
Figure 3B:
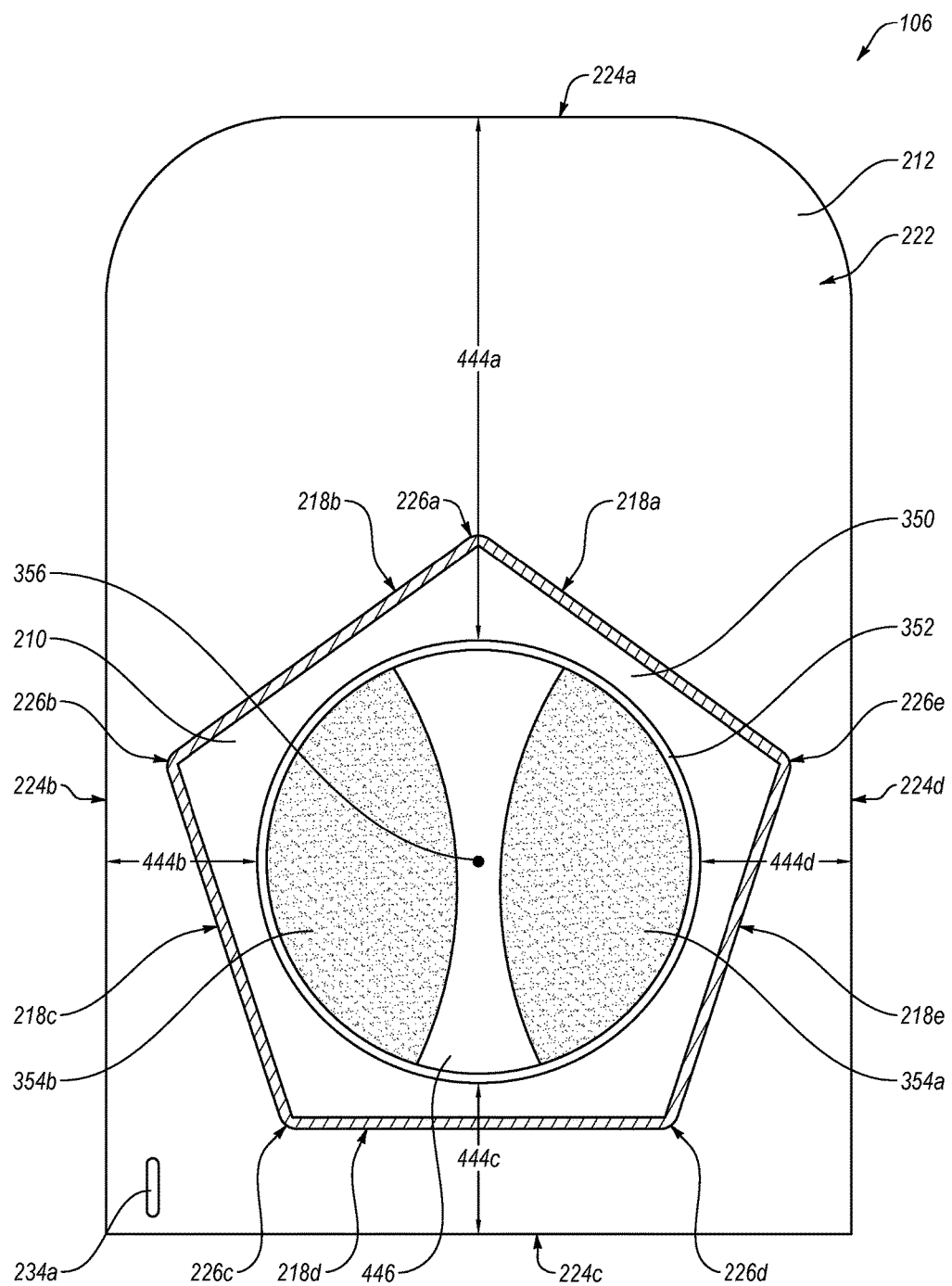
FIG. 3B illustrates another view of the junction box of FIG. 1.
Figure 4A:
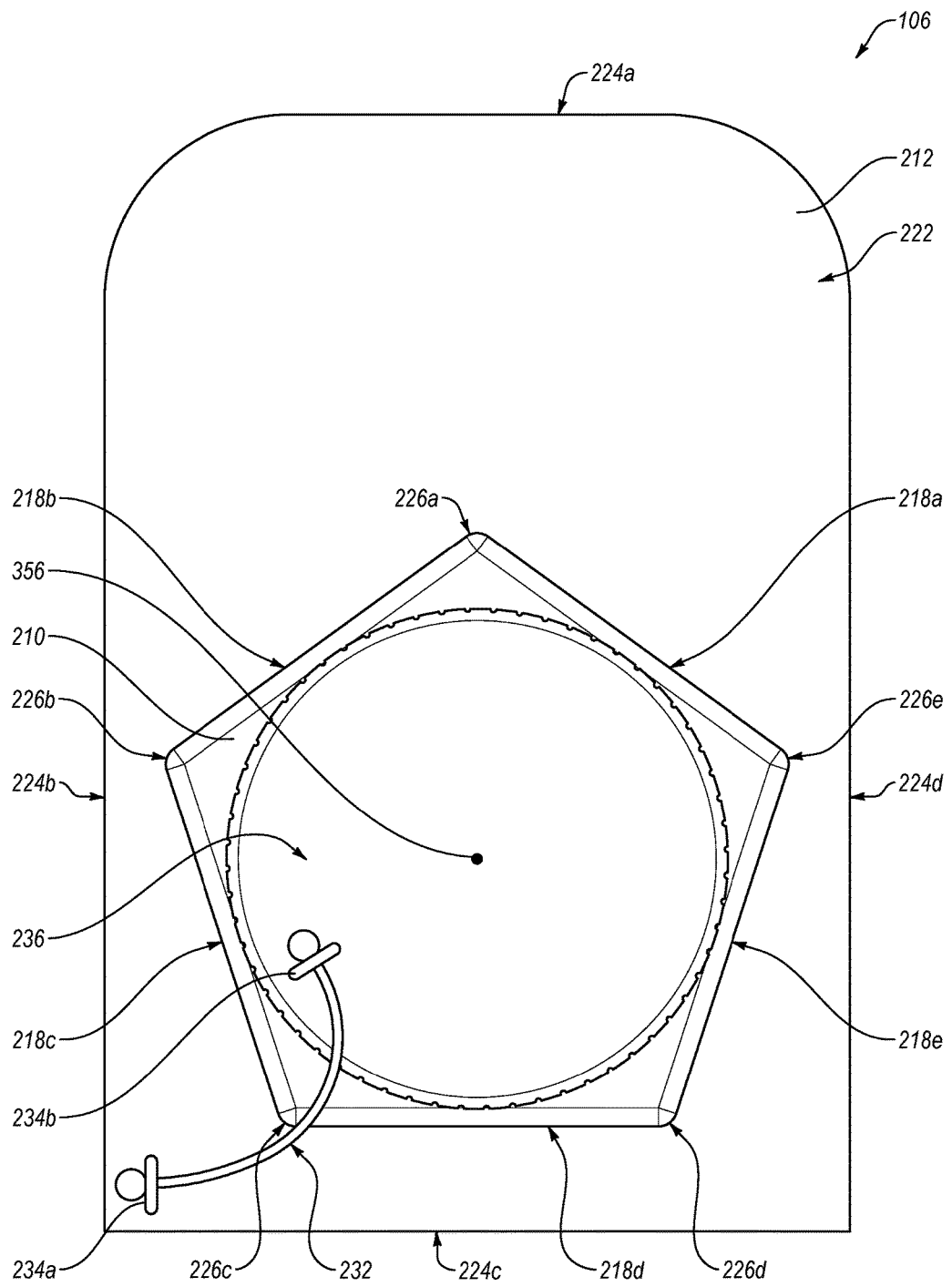
FIG. 4A illustrates another view of the junction box of FIG. 1.
Figure 4B:
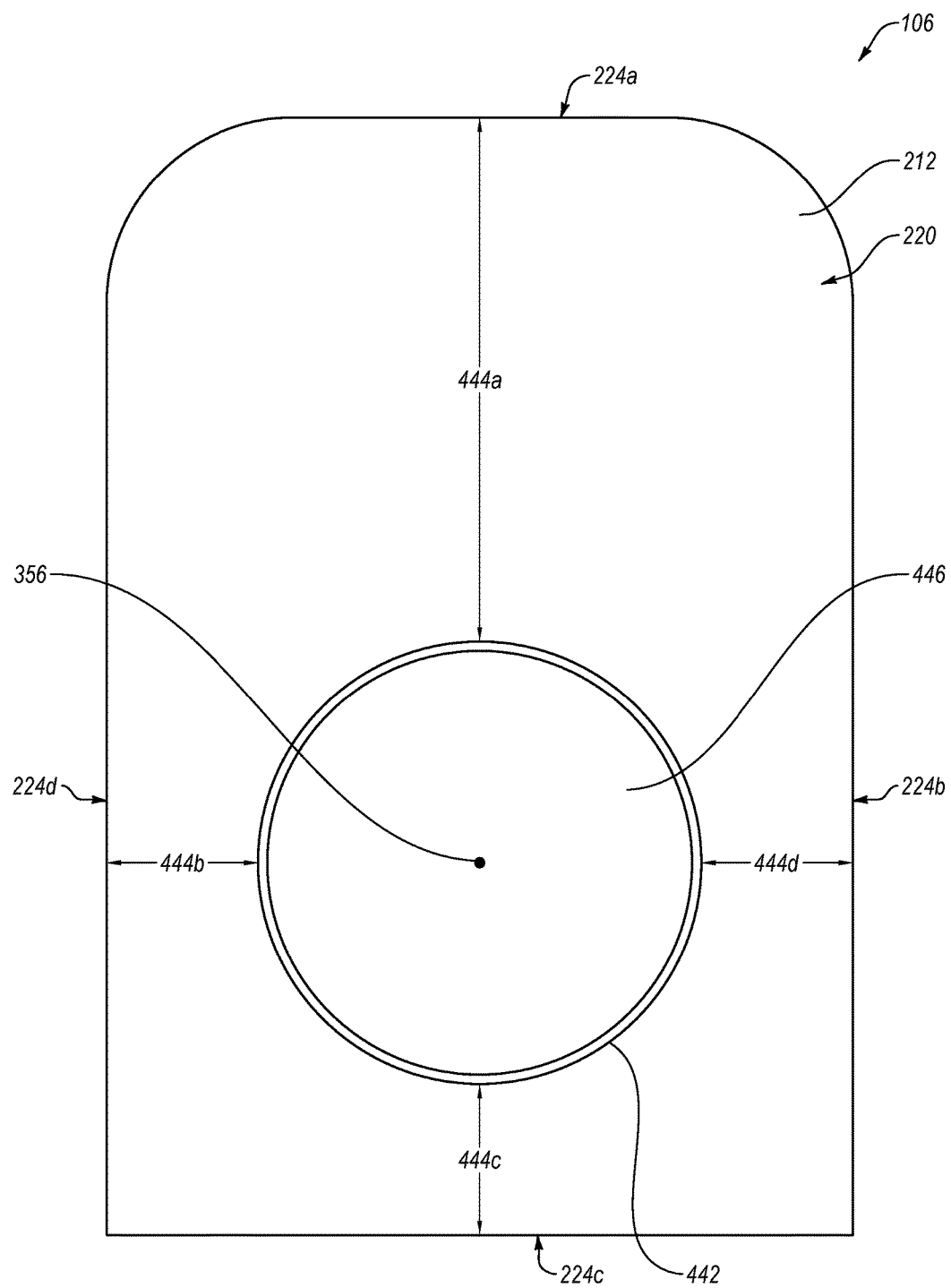
FIG. 4B illustrates another view of the junction box of FIG. 1.

FIGS. 3A and 3B illustrate sectional views of the junction box 106 of FIGS. 2A and 2B. FIG. 3A is a side-sectional view across the housing 210 in a first direction. FIG. 3B is another sectional view along the height of the sidewalls 218 above the flashing 212. FIGS. 4A and 4B illustrate a top view and a bottom view, respectively of the junction box 106 of FIGS. 2A and 2B. FIGS. 3A-4B include components and features described with reference to FIGS. 2A and 2B. Description of these components and features are not repeated with reference to FIGS. 3A-4B.

The flashing 212 may include a first surface 220 (FIGS. 3A and 4B). The first surface 220 may be a substantially parallel plane to the second surface 222 of the flashing 212. The first surface 220 of the flashing 212 may define a first circular groove 442 (FIGS. 3A and 4B). A size and a position of the first circular groove 442 may correspond to the size and the position of the second circular groove 352 (FIG. 3A). For example, a diameter of the first circular groove 442 may be substantially the same to the diameter of the second circular groove 352. In some embodiments, the diameter of the first circular groove 442 (and the second circular groove 352) may be equal to about three inches. In other embodiments, the diameter may be greater than about three inches. For example, the diameter of the first circular groove 442 may be equal to about five inches, or another suitable diameter.

In the depicted embodiment, the first circular groove 442 and the second circular groove 352 may be concentric around an axis 356. In some embodiments, the axis 356 may be positioned at a center point of the housing 210. In other embodiments, the axis 356 may be positioned at another point of the housing 210.

The first circular groove 442 may indicate suitable placement of sealant or other suitable adhesive on the first surface 220 of the flashing 212. Suitable placement of the sealant may be between the first circular groove 442 and the edges 224 of the flashing 212. The suitable placement may prevent a user from placing a hole in the bottom portion 350 that corresponds to where the sealant may be placed. In some embodiments, the sealant may be placed in a semi-circle shape. The first circular groove 442 may provide a reference for a radius of the semi-circle shape.

Although, the first circular groove 442 as illustrated is a groove defined by the first surface 220 of the flashing 212, it is understood that the first circular groove 442 may include another appropriate indicia for indication of suitable placement of sealant on the first surface 220 of the flashing 212.

The housing 210 may define an opening 216. The opening 216 may provide access to an interior volume 348 of the housing 210 (FIG. 3A). The interior volume 348 may be defined by the bottom portion 350, the sidewalls 218, the top portion 240, and the lid 214 when the lid 214 is selectively attached to the housing 210. In some embodiments, a size and a position of the opening 216 may correspond to the second circular groove 352 and/or the first circular groove 442. In other embodiments, the opening 216 may include a diameter that is smaller than or greater than the diameter of the second circular groove 352 and/or the first circular groove 442.

In some embodiments, the opening 216, the first circular groove 442, and the second circular groove 352 may include substantially similar diameters. Additionally, the opening 216, the first circular groove 442, and the second circular groove 352 may be concentric around the axis 356. In some embodiments, the lid 214 may be concentric around the axis 356 (shown e.g., in FIG. 4A).

A perimeter of the second circular groove 352 may be at least a particular distance away from the edges 224. In some embodiments, the particular distance may be equal to or greater than about one inch. For example, the particular distance may be equal to about 1.5 inches. As another example, the particular distance may be equal to about two inches.

The perimeter of the second circular groove 352 may be a first distance 444a away from the first edge 224a (FIG. 3B), a second distance 444b away from the second edge 224b (FIG. 3B), a third distance 444c away from the third edge 224c (FIG. 3B), and a fourth distance 444d away from the fourth edge 224d (FIG. 3B). The first distance 444a, the second distance 444b, the third distance 444c, and the fourth distance 444d are collectively referred to as distances 444.

In some embodiments, each of the distances 444 may be equal to or greater than the particular distance. The particular distance may be selected to ensure that the fasteners are implemented in an interior portion of the junction box 106. Additionally, in some embodiments, at least some of the distances 444 may be equal to one another. For example, the second distance 444b, the third distance 444c, and the fourth distance 444d may be equal to each other and the first distance 444a may be different. In other embodiments, the distances 444 may all be different from one another.

The second circular groove 352 may include a first indicium 354a and a second indicium 354b (FIG. 3B) (collectively, 'indicia 354'). The indicia 354 may indicate suitable placement of fasteners used for attaching the junction box 106 to a structure (e.g., 108 of FIG. 1). The indicia 354 may include indicia of suitable fastener locations in the bottom portion 350. The indicia 354 may indicate suitable zones for placement of the fasteners to balance a load associated with attachment of the junction box 106 to the structure. For example, two fasteners may be used to attach the junction box 106 to the structure. One of the two fasteners may be placed in each zone indicated by one of the indicia 354. Although, the indicia 354 are illustrated as being oriented vertically in relation to the first edge 224a and the third edge 224c, it is understood that the indicia 354 may be oriented in any appropriate manner for balanced placement of the fasteners. Additionally, although, the indicia 354 are illustrated as including two indicia 354, it is understood that the junction box 106 may include one or more indicia 354. Alternatively, the indicia 354 may be omitted in some embodiments. The fasteners may include any appropriate fastener such as screws, bolts, staples, etc.

The first circular groove 442 may be the first distance 444a away from the first edge 224a, the second distance 444b away from the second edge 224b, the third distance 444c away from the third edge 224c, and the fourth distance 444d away from the fourth edge 224d. The distances 444 in relation to the first circular groove 442 may be the same or substantially similar to the distances 444 in relation to the second circular groove 352.

Figure 5:
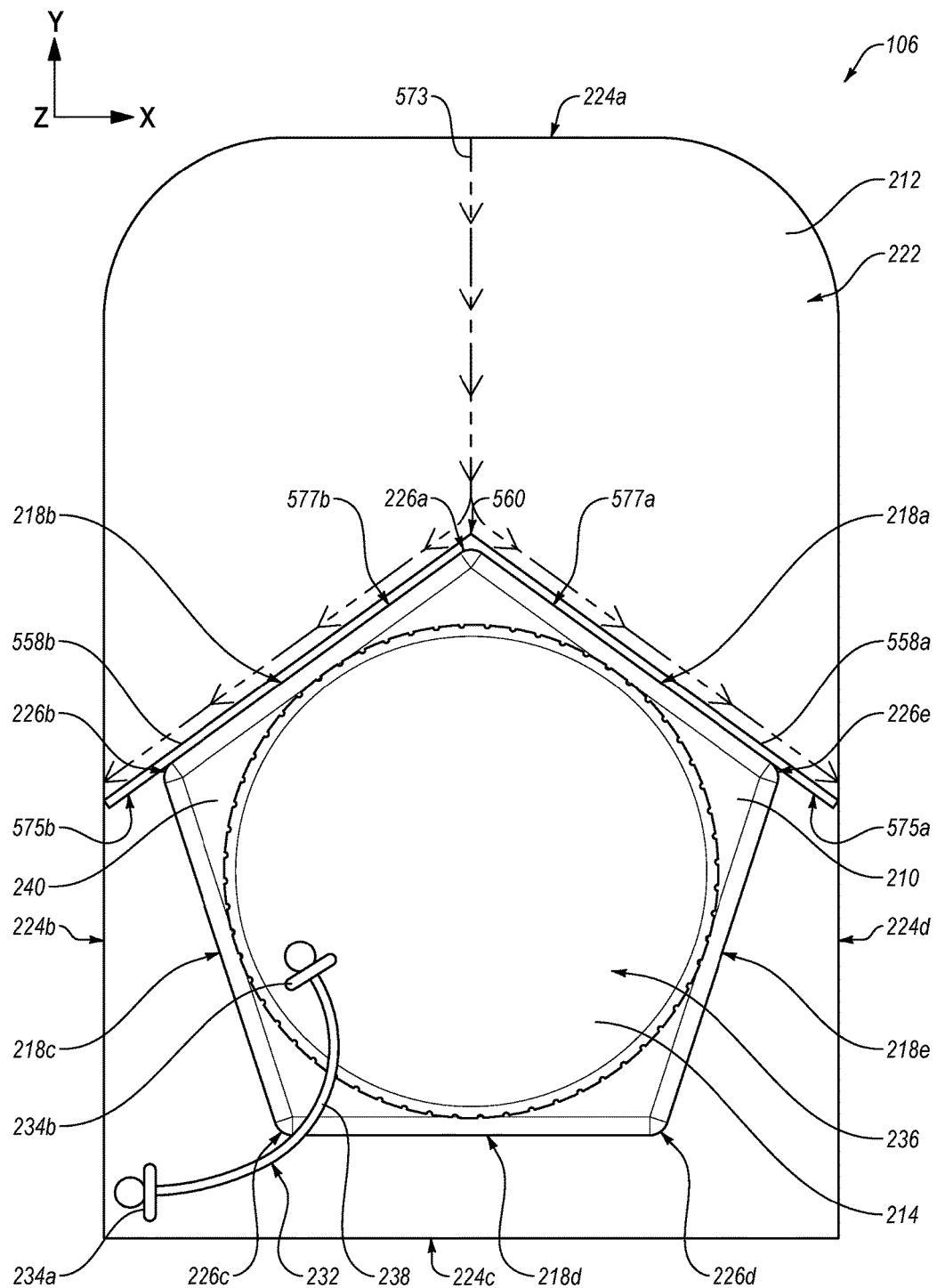
FIG. 5 illustrates another view of the junction box of FIG. 1.

FIG. 5 illustrates the junction box 106 of FIG. 1 implemented with eaves 558a and 558b (generally, eave 558 or eaves 558). FIG. 5 depicts a view of the junction box 106 with the eaves 558 that is substantially similar to the view of FIG. 3. The eaves 558 may be employed with the junction box 106 to shed a fluid 573 such as rain or melted snow away from the sidewalls 218 of the housing 210. Implementation of the eaves 558 may reduce introduction of the fluid 573 to the junction box 106 and may increase the life of the junction box 106.

In the depicted embodiment, a lower surface 575a of the first eave 558a may contact an upper surface 577a of the first sidewall 218a. Likewise, a lower surface 575b of the second eave 558b may contact an upper surface 577b of the second sidewall 218b. Contact between the lower surfaces 575 of the eaves 558 and the upper surfaces 577 of the sidewalls 218 may prevent or reduce the fluid 573 and other environmental items from getting between the eaves 558 and the sidewalls 218.

The first eave 558a and the second eave 558b may merge to form an eave end 560. The eave end 560 may be oriented towards the first edge 224a. Additionally, the eave end 560 may correspond to the first end 226a. The orientation of the eave end 560 may be the same or substantially similar to the orientation of the first end 226a. The orientation of the eave end 560 may dictate at least partially the flow of the fluid 573. For instance, the eave end 560 may be oriented such that the fluid 573 flowing away (e.g., in a negative y-direction of FIG. 5) from the first edge 224a may contact the eave end 560 and be diverted along the eaves 558 and away from the first and the second sidewalls 218a and 218b.

In the depicted embodiment, the first eave 558a may extend from the eave end 560 past the fifth end 226e all the way to or at least partially towards the fourth edge 224d. The term "all the way to" may describe embodiments in which an end of the first eave 558a may be coplanar with the fourth edge 224d. Similarly, the second eave 558b may extend from the eave end 560 past the second end 226b all the way to or at least partially towards the second edge 224b. Extension of the eaves 558 towards the edges 224b and 224d may further divert the fluid 573 away from the fifth end 226e and the second end 226b. In particular, extension of the eaves 558 past the sidewalls 218a and 218b may divert the fluid 573 onto portions of the exterior surface that surrounds the junction box 106.

In the embodiment depicted in FIG. 5, the first eave 558a extends from the fourth edge 224d to the eave end 560 and the second eave 558b extends from the second edge 224b to the eave end 560. In some embodiments, the first eave 558a may extend from the fourth edge 224d to the fifth end 226e and the second eave 558b may extend from the second edge 224b to the second end 226b.

In some embodiments, the first eave 558a may be positioned at an angle that is the same or substantially similar to an angle of the first sidewall 218a relative to the first edge 224a. Likewise, the second eave 558b may be positioned at angle that is the same or substantially similar to an angle of the second sidewall 218b relative to the first edge 224a.

A height of the eaves 558 from the flashing 212 (e.g., in the z-direction of FIG. 5) may be the same or substantially similar to the height of the sidewalls 218. In other embodiments, the height of the eaves 558 may be greater than or less than the height of the sidewalls 218.

FIGS. 6A-6F illustrate alternative junction box configurations 606a-606f (generally, alternative boxes 606 or alternative box 606). Each of the alternative boxes 606 include an alternatively shaped housing 610a-610f as described below. Other than the alternatively shaped housing 610a-610f, the alternative boxes 606 may be substantially similar to the junction box 106 described elsewhere in the present disclosure.

Figure 6A:
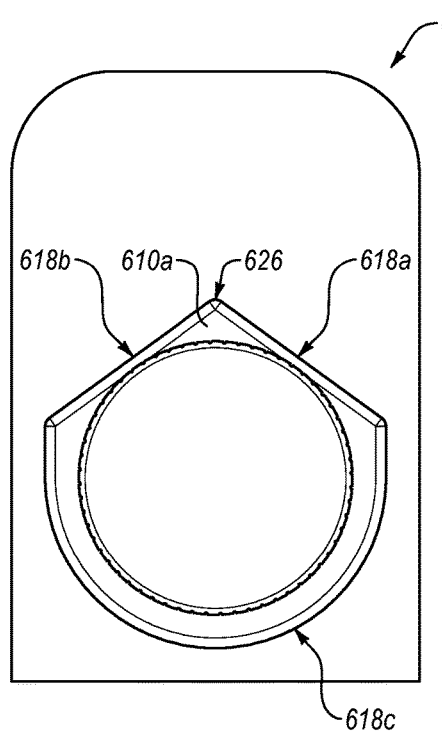
FIGS. 6A-6F illustrate alternative junction box configurations.

FIG. 6A illustrates a first alternative junction box 606a that includes a first housing 610a. The first housing 610a may include a first sidewall 618a, a second sidewall 618b, and a third sidewall 618c. The first alternative junction box 606a may be similar to the junction box 106 described elsewhere in the present disclosure. However, in the first alternative junction box 606a, the third sidewall 618c may form a semi-circle or substantially semi-circular shape and is attached to the first sidewall 618a and the second sidewall 618b. The first sidewall 618a and the second sidewall 618b may form a first end 626. The first sidewall 618a, the second sidewall 618b, and the first end 626 are similar to the first sidewall, the second sidewall, and the first end described above. The third sidewall 618c may define multiple dimples, which may indicate suitable positions for creating a hole in the third sidewall 618c. The dimples of the third sidewall 618c are similar to the dimples described above.

Figure 6B:
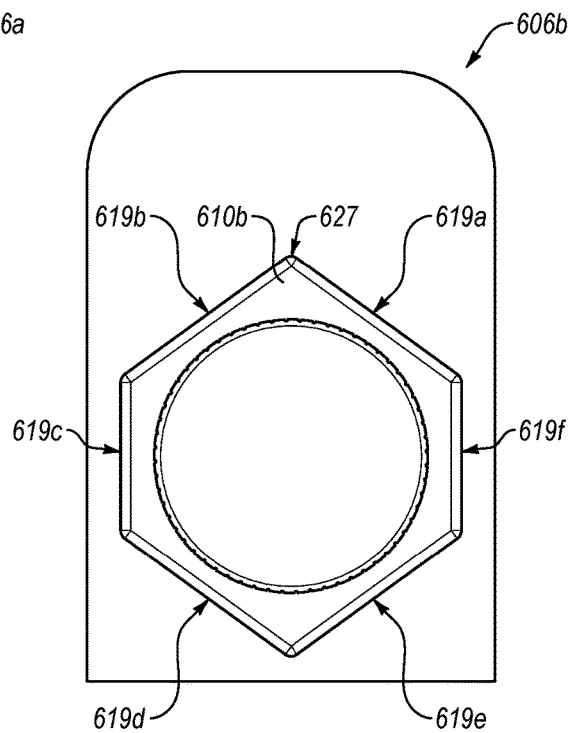

FIG. 6B illustrates a second alternative junction box 606b that includes a second housing 610b. The second housing 610b may include a first sidewall 619a, a second sidewall 619b, a third sidewall 619c, a fourth sidewall 619d, a fifth sidewall 619e, and a sixth sidewall 619f. The second alternative junction box 106b may be similar to the junction box 106 described elsewhere in the present disclosure. However, in the second alternative junction box 606b the sidewalls 619 may form a hexagonal or substantially hexagonal shape. The first sidewall 619a and the second sidewall 619b may form a first end 627. The first sidewall 619a, the second sidewall 619b, and the first end 627 are similar to the first sidewall, the second sidewall, and the first end described above.

One or more of the third sidewall 619c, the fourth sidewall 619d, the fifth sidewall 619e, and the sixth sidewall 619f may define multiple dimples, which may indicate suitable positions for creating a hole therein. The dimples of the third sidewall 619c, the fourth sidewall 619d, the fifth sidewall 619e, and the sixth sidewall 619f are similar to the dimples described above.

Figure 6C:
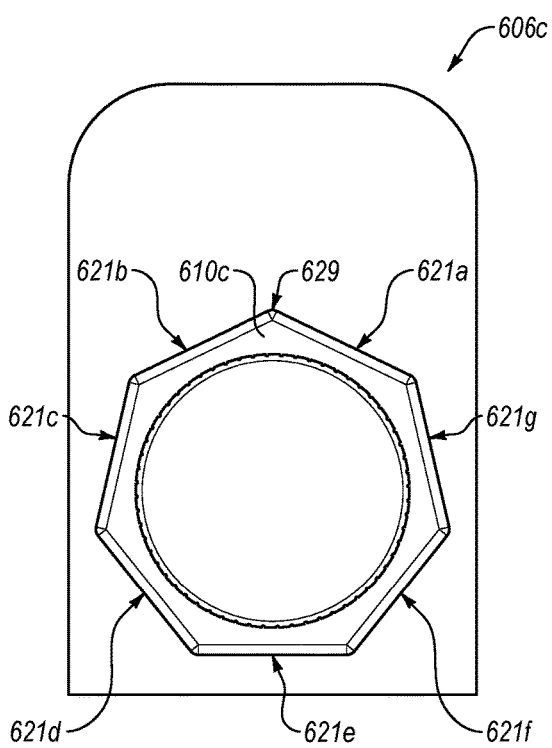

FIG. 6C illustrates a third alternative junction box 606c that includes a third housing 610c. The third housing 610c may include a first sidewall 621a, a second sidewall 621b, a third sidewall 621c, a fourth sidewall 621d, a fifth sidewall 621e, a sixth sidewall 621f, and a seventh sidewall 621g. The third alternative junction box 106c may be similar to the junction box 106 described elsewhere in the present disclosure. However, in the third alternative junction box 606c the sidewalls 621 may form a heptagonal or a substantially heptagonal shape. The first sidewall 621a and the second sidewall 621b may form a first end 629. The first sidewall 621a, the second sidewall 621b, and the first end 629 are similar to the first sidewall, the second sidewall, and the first end described above.

One or more of the fourth sidewall 621d, the fifth sidewall 621e, and the sixth sidewall 621f may define multiple dimples, which may indicate suitable positions for creating a hole therein. The dimples of the fourth sidewall 621d, the fifth sidewall 621e, and the sixth sidewall 621f are similar to the dimples described above.

Figure 6D:
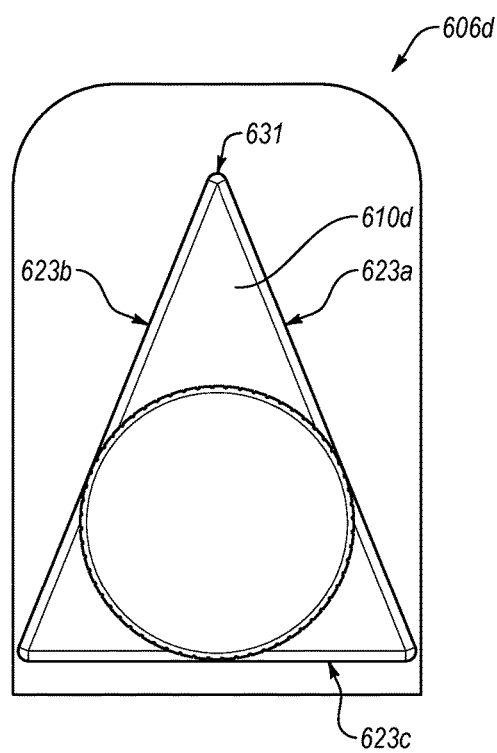

FIG. 6D illustrates a fourth alternative junction box 606d that includes a fourth housing 610d. The fourth housing 610d may include a first sidewall 623a, a second sidewall 623b, and a third sidewall 623c. The fourth alternative junction box 606d may be similar to the junction box 106 described elsewhere herein. However, in the fourth alternative junction box 606d the sidewalls 623 may form a triangular shape. The first sidewall 623a and the second sidewall 623b may form a first end 631. The first sidewall 623a, the second sidewall 623b, and the first end 631 are similar to the first sidewall, the second sidewall, and the first end described above. The third sidewall 623c may define multiple dimples, which may indicate suitable positions for creating a hole in the third sidewall 623c. The dimples of the third sidewall 623c are similar to the dimples described above.

Figure 6E:
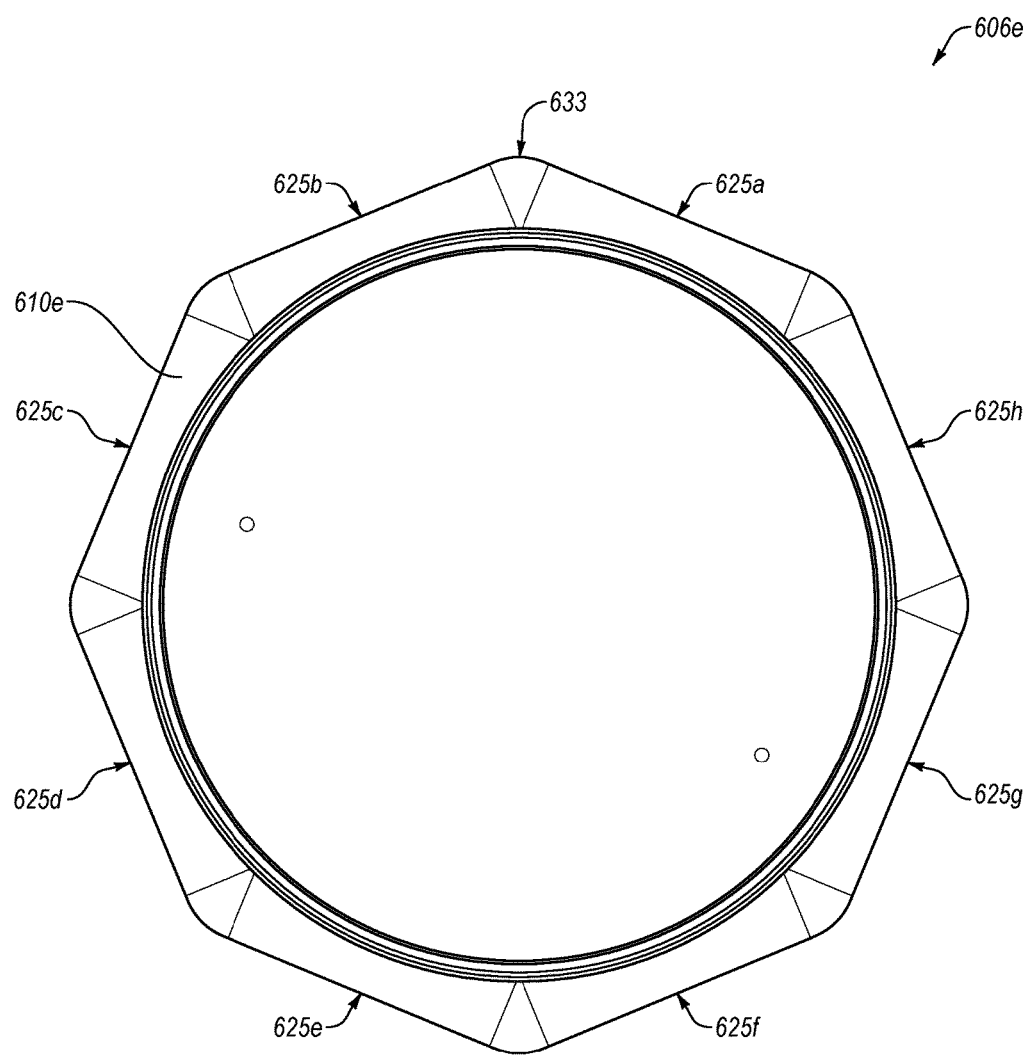

FIG. 6E illustrates a fifth alternative junction box 606e that includes a fifth housing 610e. The fifth housing 610e may include a first sidewall 625a, a second sidewall 625b, a third sidewall 625c, a fourth sidewall 625d, a fifth sidewall 625e, a sixth sidewall 625f, a seventh sidewall 625g, and an eighth sidewall 625h. The fifth alternative junction box 606e may be similar to the junction box 106 described elsewhere herein. However, in the fifth alternative junction box 606e the sidewalls 625 may form an octagonal shape. The first sidewall 625a and the second sidewall 625b may form a first end 633. The first sidewall 625a, the second sidewall 625b, and the first end 633 are similar to the first sidewall, the second sidewall, and the first end described above. The fourth sidewall 625d, the fifth sidewall 625e, the sixth sidewall 625f, and the seventh sidewall 625g may define multiple dimples, which may indicate suitable positions for creating a hole therein. The dimples of fourth sidewall 625d, the fifth sidewall 625e, the sixth sidewall 625f, and the seventh sidewall 625g are similar to the dimples described above.

Figure 6F:
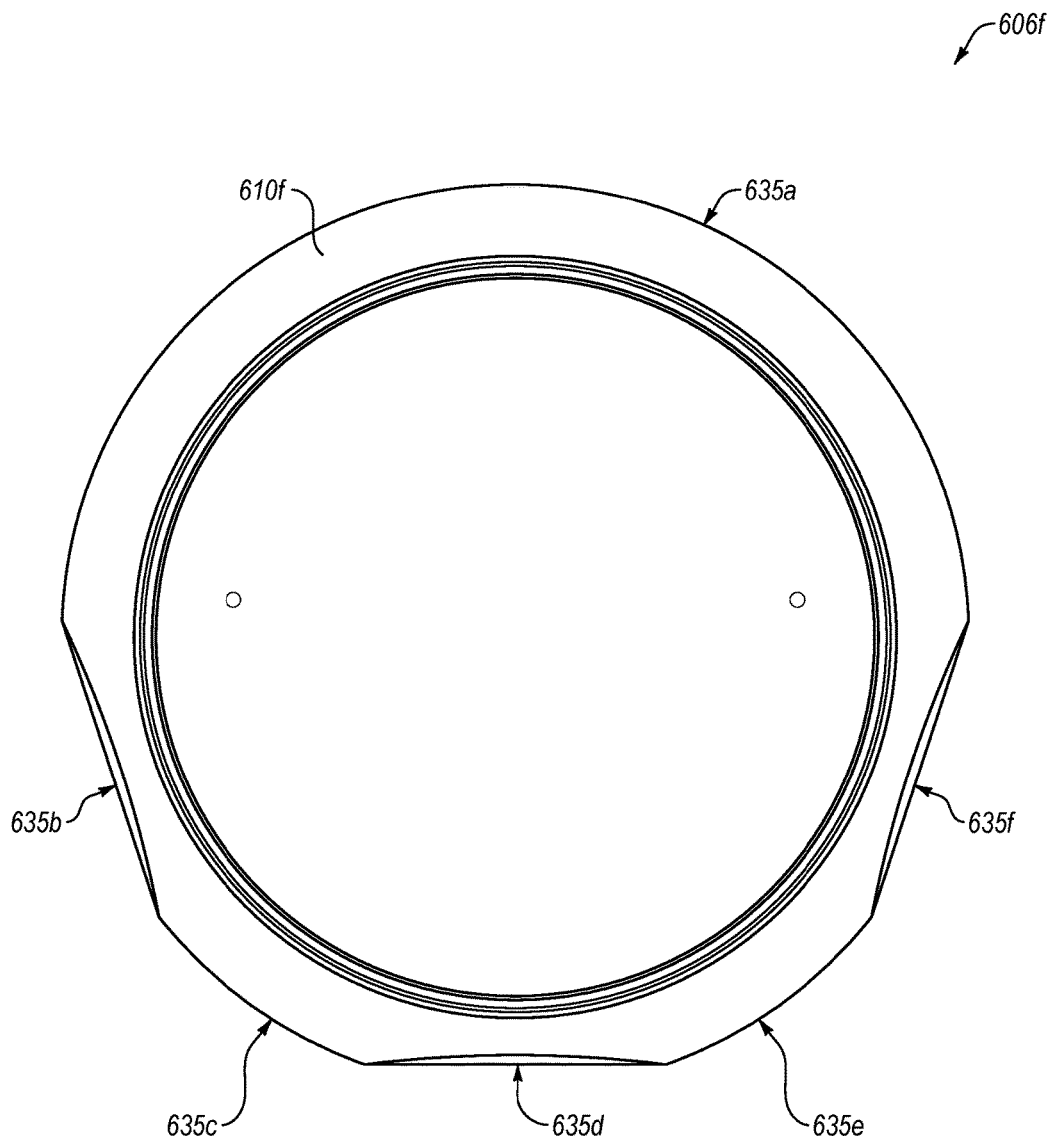

FIG. 6F illustrates a sixth alternative junction box 606f that includes a sixth housing 610f. The sixth housing 610f may include a first sidewall 635a, a second sidewall 635b, a third sidewall 635c, a fourth sidewall 635d, a fifth sidewall 635e, and a sixth sidewall 635f. The sixth alternative junction box 606f may be similar to the junction box 106 described elsewhere herein. However, in the fourth alternative junction box 606d the sidewalls 635 may form an irregular shape. The first sidewall 635a, the third sidewall 635c, and the fifth sidewall 635e may form a semi-circle or substantially semi-circular shapes. The first sidewall 635a may be similar to the first end described above in that it may be configured to prevent fluid from pooling on a surface of the sixth housing 610f. The second sidewall 635b, the fourth sidewall 635d, and the sixth sidewall 635f may define multiple dimples, which may indicate suitable positions for creating a hole therein. The dimples of the third sidewall 623c are similar to the dimples described above.

Figure 7:
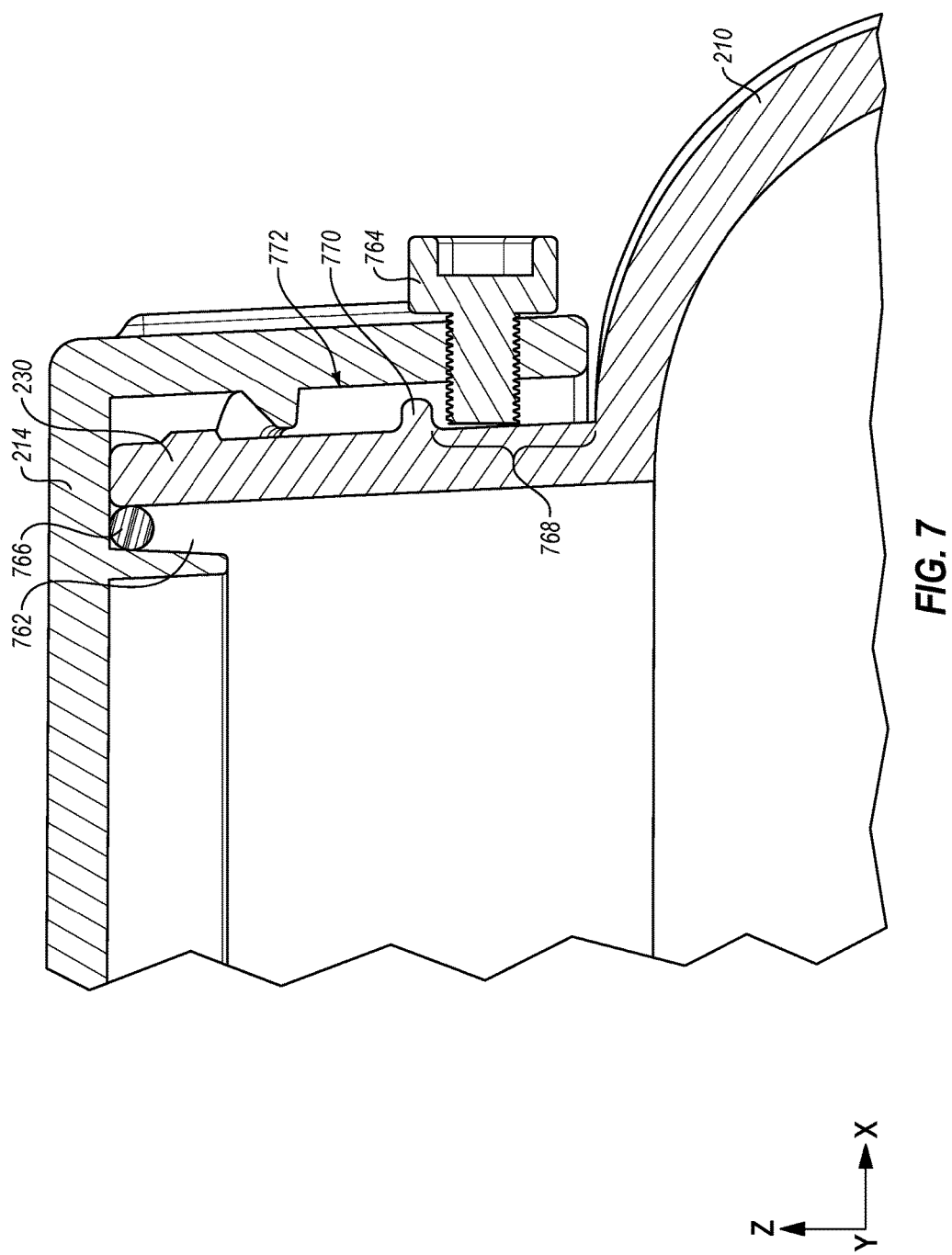
FIG. 7 illustrates a side-sectional view of a portion of the housing and the lid, all arranged in accordance with at least one embodiment described in the present disclosure.

FIG. 7 illustrates a side-sectional view of a portion of the housing 210 and the lid 214 in the first direction. In some embodiments, when the lid 214 is attached to the attachment portion 230, a gasket 766 may be positioned in at least a portion of a gasket space 762 defined by a portion of the lid 214 and a portion of the attachment portion 230. The lid 214, when attached to the attachment portion 230, may apply pressure on the gasket 766 and force the gasket 766 toward the attachment portion 230. Additionally or alternatively, the lid 214, when attached to the attachment portion 230, may compress the gasket 766. In some embodiments, the gasket 766 may include an EPDM material or any other appropriate material.

In some embodiments, a lid fastener 764 and a lip 770 of the attachment portion 230 may be used to secure the lid 214 to the attachment portion 230. When the lid 214 is attached to the attachment portion 230, the lid fastener 764 may be adjacent to a portion 768 of the attachment portion 230, which may be below the lip 770 in the y-direction. The lid fastener 764 may be configured to move between a locked position and an open position. In the locked position, the lid fastener 764 may extend beyond a surface 772 of the lid 214. In the open position, the lid fastener 764 may be positioned flush or form a recess with the surface 772 of the lid 214. The lid fastener 764 is illustrated in FIG. 7 in the locked position.

The lid fastener 764, when the lid 214 is attached to the attachment portion 230 and the lid fastener 764 is in the locked position, may extend toward the portion 768 of the attachment portion 230. Additionally, the lid fastener 764 may be positioned such that the lip 770 and the lid fastener 764 prevent the lid 214 from being detached from the attachment portion 230. The lid fastener 764, in the open position, may be positioned flush or form a recess with the surface 772 of the lid 214 such that the lid 214 may be able to be detach from the attachment portion 230.

The present disclosure is not to be limited in terms of the particular embodiments described in the present disclosure, which are intended as illustrations of various aspects. Many modifications and variations can be made without departing from its spirit and scope, as will be apparent to those skilled in the art. Functionally equivalent methods and apparatuses within the scope of the present disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from the scope of the present embodiment. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A junction box comprising:
    a flashing including a first surface and a second surface, the first surface defining a first circular groove; and
    a housing attached to the flashing and positioned at least a second distance from a plurality of edges of the flashing, the housing including:
        a plurality of sidewalls that form a plurality of ends, the plurality of ends including a first end formed by a first sidewall and a second sidewall that is oriented towards a first edge of the flashing;
        a bottom portion that is attached to the plurality of sidewalls and that defines a second circular groove including a substantially similar diameter as the first circular groove and is substantially concentric with the first circular groove on a substantially parallel plane, the second circular groove indicating suitable hole positions in the bottom portion; and
        a top portion that defines an opening, the opening is substantially concentric with the second circular groove.

2. The junction box of claim 1, wherein the flashing and the housing are a single unibody piece.

3. The junction box of claim 1, wherein the plurality of sidewalls include a third sidewall, a fourth sidewall, and a fifth sidewall, wherein the third sidewall, the fourth sidewall, and the fifth sidewall each include a plurality of dimples that indicate suitable hole positions.

4. The junction box of claim 3, wherein the pluralities of dimples each include a first dimple that is positioned on a center point of one of the plurality of sidewalls.

5. The junction box of claim 4, wherein each of the pluralities of dimples also define a second dimple that is separated from a third dimple by a particular distance.

6. The junction box of claim 3, further comprising:
    a first eave attached to a second end formed by the second sidewall and the third sidewall; and
    a second eave attached to a third end formed by the first sidewall and the fourth sidewall.

7. The junction box of claim 6, wherein:
    the first eave is positioned at a first angle that is substantially similar to a second angle of the second sidewall relative to the first edge of the flashing; and
    the second eave is positioned at a third angle that is substantially similar to a fourth angle of the first sidewall relative to the first edge of the flashing.

8. The junction box of claim 1, wherein the second circular groove includes indicia of suitable fastener locations.

9. The junction box of claim 1, further comprising a lid selectively attachable to the housing to environmentally seal a volume defined by the housing.

10. The junction box of claim 9, further comprising a retention system that retains the lid relative to the flashing.

11. The junction box of claim 10, wherein the retention system includes:
    a first retention portion attached to the second surface of the flashing;
    a second retention portion attached to a first surface of the lid; and
    the first retention portion is attached to the second retention portion by a retention device.

12. The junction box of claim 9, wherein:
    the housing further comprises an attachment portion attached to the opening; and
    the lid selectively attaches to the housing via the attachment portion.

13. The junction box of claim 12, wherein the attachment portion includes a threaded portion.

14. The junction box of claim 1, wherein the first circular groove includes a perimeter disposed a particular distance from the edges of the flashing.

15. The junction box of claim 1, wherein the housing and the flashing include a polycarbonate material infused with a hydroxyphenyl-benzotriazole material.

16. The junction box of claim 1, wherein the housing further includes a first portion within a perimeter of the first circular groove and the first portion within the perimeter of the first circular groove comprises an ethylene propylene diene monomer (EPDM) rubber.

17. A junction box comprising:
a single unibody piece including:
a flashing including a first surface and a second surface, the first surface defining a first circular groove and a perimeter of the first circular groove that is at least one and a half inches from edges of the flashing;
a housing positioned at least a second distance from the edges of the flashing, the housing including:
a plurality of sidewalls that form a plurality of ends, the plurality of ends including a first end formed by a first sidewall and a second sidewall that is oriented towards a first edge of the flashing and a third sidewall, a fourth sidewall, and a fifth sidewall each include a plurality of dimples to indicate suitable hole positions;
a bottom portion that is attached to the plurality of sidewalls and that defines a second circular groove including a substantially similar diameter to the first circular groove and is substantially concentric with the first circular groove on a substantially parallel plane, the second circular groove indicating suitable hole positions in the bottom portion, and the second circular groove includes indicia of suitable fastener locations;
a top portion that defines an opening, the opening is substantially concentric with the second circular groove; and
a threaded portion that is attached to the opening;
a first eave attached to a second end formed by the second sidewall and a third sidewall, the first eave is positioned at a first angle that is substantially similar to a second angle of the second sidewall relative to the first edge of the flashing; and
a second eave attached to a third end formed by the first sidewall and a fourth sidewall, and the second eave is positioned at a third angle that is substantially similar to a fourth angle of the first sidewall relative to the first edge of the flashing.

18. The junction box of claim 17, further comprising:
a first retention portion attached to the second surface of the flashing;
a lid selectively attachable to the housing via the threaded portion, the lid including a second retention portion attached to a first surface of the lid, and the lid environmentally seals a volume defined by the housing and the lid when attached to the housing; and
the first retention portion is attached to the second retention portion by a retention device.

19. A junction box comprising:
a housing, including:
a plurality of sidewalls including a third sidewall, a fourth sidewall, and a fifth sidewall that each include a plurality of dimples to indicate suitable hole positions;
a bottom portion that is attached to the plurality of sidewalls and that defines a second circular groove and a first circular groove, wherein the second circular groove includes a substantially similar diameter as the first circular groove and is substantially concentric with the first circular groove located on a substantially parallel plane, the second circular groove indicating suitable hole positions in the bottom portion, and the second circular groove including indicia of suitable fastener locations; and
a top portion that defines an opening, the opening is substantially concentric with the second circular groove.

20. The junction box of claim 19, wherein the first circular groove and the second circular groove are at least one and a half inches from a sidewall of the housing, the junction box further comprising:
a first retention portion positioned on a first surface of a sidewall;
a threaded portion attached to the opening;
a lid selectively attachable to the housing via the threaded portion, the lid including a second retention portion positioned on a first surface of the lid, and the lid environmentally seals a volume defined by the housing and the lid when attached to the housing; and
a retention device that is attached to the first retention portion and the second retention portion.

* * * * *